United States Patent
Lee

(10) Patent No.: US 8,143,939 B2
(45) Date of Patent: Mar. 27, 2012

(54) CHARGE PUMP DRIVING CIRCUIT AND CHARGE PUMP SYSTEM

(75) Inventor: Chow-Peng Lee, Sinshih Township, Tainan County (TW)

(73) Assignee: Himax Analogic, Inc., Tainan County (TW)

( * ) Notice: Subject to any disclaimer, the term of this patent is extended or adjusted under 35 U.S.C. 154(b) by 211 days.

(21) Appl. No.: 12/691,779

(22) Filed: Jan. 22, 2010

(65) Prior Publication Data

US 2011/0181346 A1 Jul. 28, 2011

(51) Int. Cl.
*G05F 1/10* (2006.01)
*G05F 3/02* (2006.01)

(52) U.S. Cl. .......................... 327/536; 327/112

(58) Field of Classification Search ........... 327/535–537
See application file for complete search history.

(56) References Cited

U.S. PATENT DOCUMENTS

| 2002/0175746 | A1* | 11/2002 | Tanaka | 327/536 |
| 2005/0218966 | A1* | 10/2005 | Azuma et al. | 327/536 |
| 2008/0012627 | A1* | 1/2008 | Kato | 327/536 |
| 2009/0278591 | A1* | 11/2009 | Pyeon et al. | 327/536 |
| 2010/0013548 | A1* | 1/2010 | Barrow | 327/536 |

* cited by examiner

*Primary Examiner* — Quan Tra
(74) *Attorney, Agent, or Firm* — Thomas, Kayden, Horstemeyer & Risley, LLP

(57) ABSTRACT

A charge pump driving circuit for generating a driving pulse signal to drive a charge pump circuit is disclosed. The charge pump driving circuit includes a control signal generator and a driving signal generator. The control signal generator generates a first control signal, a second control signal, and a third control signal, in which the third control signal transits in the first place, the first control signal transits next, and the second control signal transits last. The driving signal generator, controlled by the first control signal, the second control signal and the third control signal, generates the driving pulse signal, in which the driving signal generator has a rare short circuit current flowing from a supply terminal providing a supply voltage to a ground terminal providing a ground voltage.

16 Claims, 3 Drawing Sheets

CHARGE PUMP DRIVING CIRCUIT AND CHARGE PUMP SYSTEM

BACKGROUND

1. Field of Invention

The present invention relates to a charge pump circuit. More particularly, the present invention relates to a charge pump circuit generating a voltage which is a multiple of the original signal.

2. Description of Related Art

Charge pump circuits are a type of DC-DC converter which uses capacitors as energy storage device and are able to provide a power source at a higher or lower voltage than that obtained from an input source. Charge pump circuits are capable of high efficiencies, sometimes as high as 90-95%. Charge pumps, employing some switching devices to control the connection between the capacitors and the voltage sources, typically obtain voltages greater than the original input voltage. To increase the voltage, this kind of charge pump includes one capacitor for storing and transferring charge to other capacitors.

The switch devices, controlling the connection between the capacitors, are driven by a driving pulse signal which is generated by a charge pump driving circuit. However, the transistors of the charge pump driving circuit usually suffer from short circuit flowing from the supply terminal to the ground terminal when the transistor are switching, which consumes much power.

Therefore, there is a need for a new charge pump driving circuit which can reduce the short circuit current and thus reduce the power consumption.

SUMMARY

According to one embodiment of the present invention, a charge pump driving circuit generating a driving pulse signal to drive a charge pump circuit is disclosed. The charge pump driving circuit includes a control signal generator and a driving signal generator. The control signal generator generates a first control signal, a second control signal, and a third control signal, in which the third control signal transits in the first place, the first control signal transits next, and the second control signal transits last. The driving signal generator, controlled by the first control signal, the second control signal and the third control signal, generates the driving pulse signal, in which the driving signal generator has rare short circuit current flowing from a supply terminal providing a supply voltage to a ground terminal providing a ground voltage.

According to another embodiment of the present invention, a charge pump system for increasing voltage of a signal is disclosed. The charge pump system includes a charge pump driving circuit and a charge pump circuit. The charge pump circuit, driven by a driving pulse signal, generates a pumped signal having voltage being a multiple of the voltage of the driving pulse signal.

The charge pump driving circuit, generating the driving pulse signal, includes a control signal generator and a driving signal generator. The control signal generator generates a first control signal, a second control signal, and a third control signal, in which the third control signal transits in the first place, the first control signal transits next, and the second control signal transits last. The driving signal generator, controlled by the first control signal, the second control signal and the third control signal, generates the driving pulse signal, in which the driving signal generator has a rare short circuit current flowing from a supply terminal providing a supply voltage to a ground terminal providing a ground voltage.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
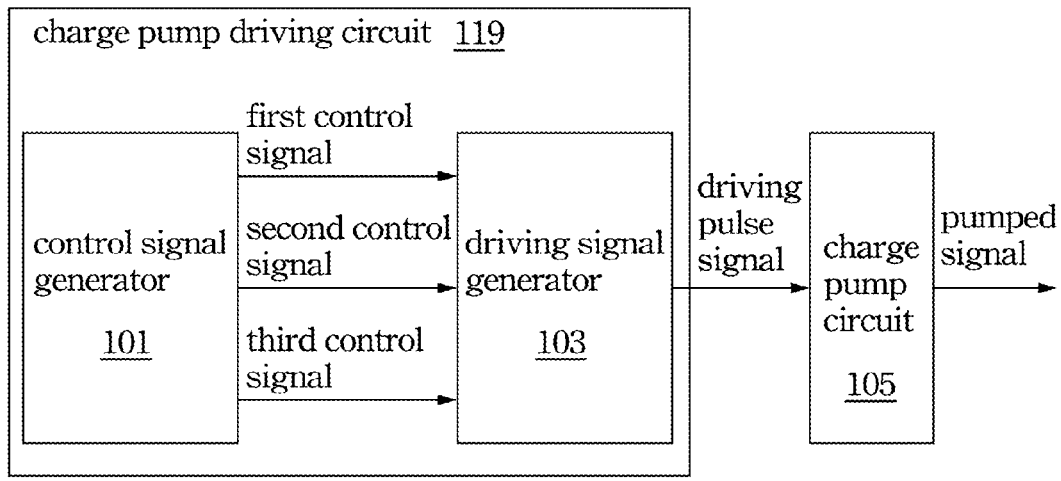
FIG. 1 is a block diagram of the charge pump system according to one embodiment of the present invention.
Figure 1:
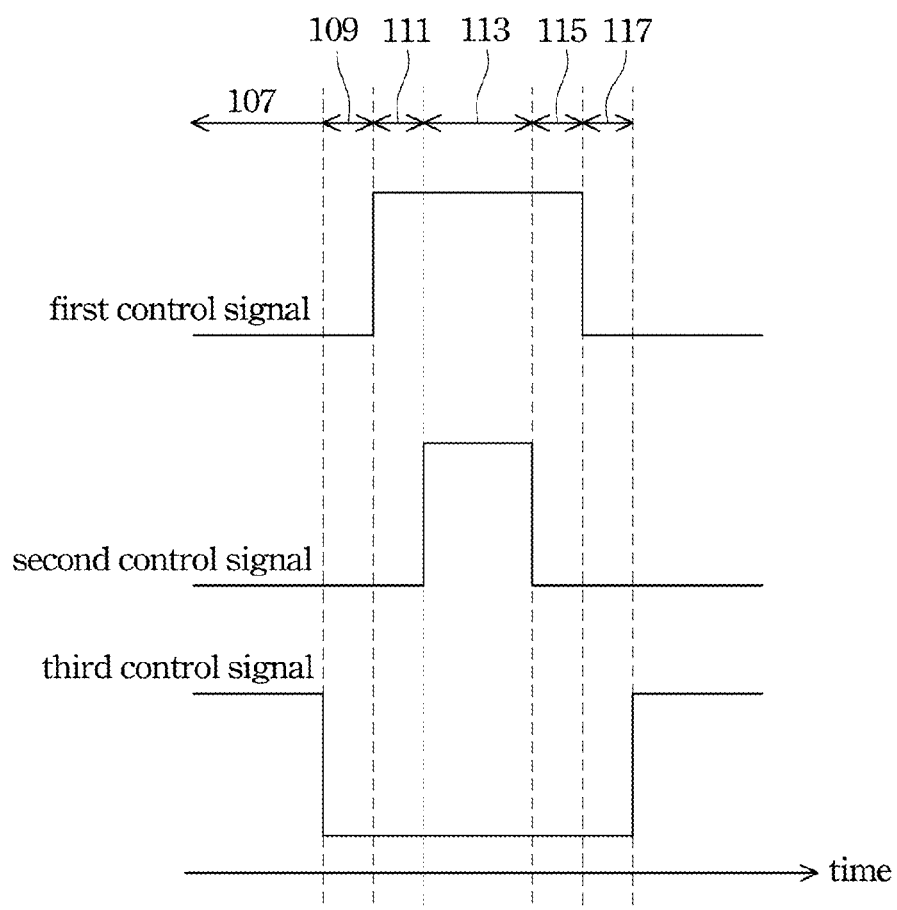

Reference will now be made in detail to the present preferred embodiments of the invention, examples of which are illustrated in the accompanying drawings. Wherever possible, the same reference numbers are used in the drawings and the description to refer to the same or like parts.

FIG. 1 is the block diagram of the charge pump system according to one embodiment of the present invention. The charge pump system which increases voltage of a signal includes a charge pump driving circuit 119 for generating a driving pulse signal, and also includes a charge pump circuit 105 driven by the driving pulse signal for generating a pumped signal having voltage being a multiple of the driving pulse signal voltage.

The charge pump driving circuit 119 includes a control signal generator 101 for generating control signals and a driving signal generator 103 for generating the driving pulse signal. The control signal generator 101 generates a first control signal, a second control signal, and a third control signal, in which the third control signal transits in the first place, the first control signal transits next, and the second control signal transits last. In more detail, the first control signal rises between the third control signal falls and the second control signal rises. In addition, the first control signal falls between the second control signal falls and the third control signal rises. As a result, there is no direct current path formed between the supply terminal and the ground terminal.

The driving signal generator 103, which is controlled by the first control signal, the second control signal and the third control signal, has a rare short circuit current flowing from a supply terminal providing a supply voltage to a ground terminal providing a ground voltage. In some cases, there might be no short circuit current flowing from the supply terminal to the ground terminal in the driving signal generator 103. As a result, power consumption caused by the short circuit current due to the logic state transition can be reduced.

Figure 2A:
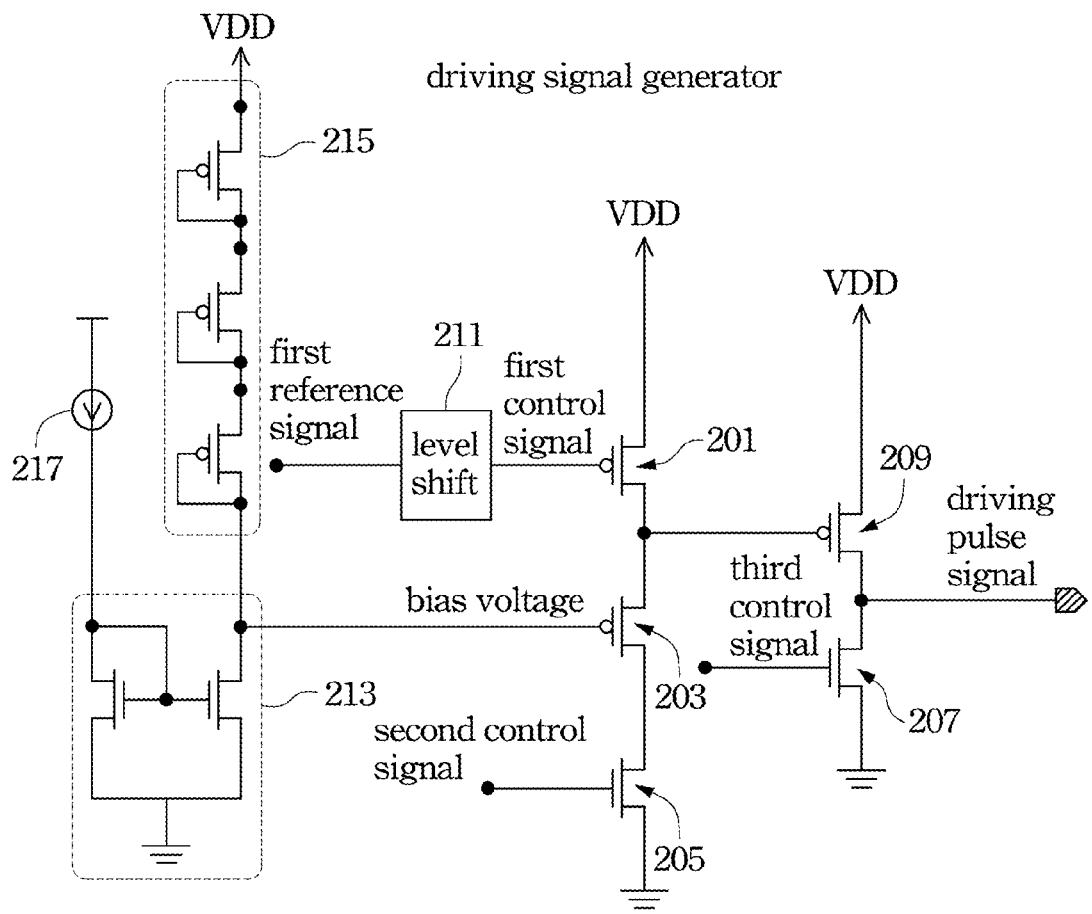
FIG. 2A is a circuit diagram of the driving signal generator according to one embodiment of the present invention.

FIG. 2A shows the circuit diagram of the driving signal generator according to one embodiment of the present invention. The driving signal generator includes a first transistor 201, a bias transistor 203, a second transistor 205, a third transistor 207, and a fourth transistor 209. The first transistor 201 has a source electrically connected to the supply terminal providing the supply voltage VDD, and a gate receiving the first control signal. The bias transistor 203 has a source electrically connected to the first transistor 201, and a gate receiving a bias voltage. The second transistor 205 has a drain electrically connected to the bias transistor 203, and a gate receiving the second control signal. The fourth transistor 209 has a source electrically connected to the supply voltage, and a gate electrically connected to the source of the bias transistor. The third transistor 207 has a drain electrically connected to the fourth transistor 209 for outputting the driving pulse signal, and a gate receiving the third control signal.

To prevent the direct current path from the supply terminal to the ground terminal, the first transistor 201 and the second transistor 205 are conductive at different time intervals, while the third transistor 207 and the fourth transistor 209 are conductive at different time intervals. In other words, the first transistor 201 and the second transistor 205 are not conductive at the same time, and the third transistor 207 and the fourth transistor 209 are not conductive at the same time.

For example, in time interval 107 shown in FIG. 1, the first transistor 201 (P MOS) and the third transistor 207 (N MOS) are turned on by the first control signal and the third control signal respectively, while the fourth transistor 209 (P MOS) is turned off by a logic high voltage. Next, the third transistor 207 is turned off by the third control signal in time interval 109. The first transistor 201 is turned off by the first control signal at the time interval 111, and the second transistor 205 is turned on by the second control signal at time interval 113 sequentially after the time interval 109.

After the time interval 113, the second control signal turns off the second transistor 205 first in the time interval 115, and the first control signal turns on the first transistor 201 in time interval 117 next. Finally, the third control signal rises and turns on the third transistor 207. The driving pulse signal having logic high level and logic low level is thus produced, while no direct current path from supply terminal to ground terminal is formed, which reduces the power consumption.

The driving signal generator further includes a level shift 211 for shifting the voltage of a first reference signal to generate the first control signal. For example, the first reference signal might be 5 volts, while the first control signal is shifted to 40 volts.

In addition, the current mirror 213 and the voltage drop circuit 215 could be employed in the driving signal generator to generate the bias voltage controlling the bias transistor 203. The current mirror 213 reproduces the current source 217 to generate a constant current. The voltage drop circuit 215, electrically connected to the current mirror 213 and biased by the constant current, decreases the supply voltage to generate the bias voltage. The voltage drop circuit 215 in detail includes three diode-connected transistors connected serially for decreasing the supply voltage by three threshold voltages (3×Vth), which makes the bias voltage a constant.

The voltage at the source of the bias transistor 203 has a maximum value as the supply voltage when the first transistor 201 is on, such as 20 volt; the voltage at the source of the bias transistor 203 also has a minimum value which is equal to the supply voltage minus a predetermined value such as 5 volt (5 volt is the gate-source junction voltage of the fourth transistor 209) when the first transistor 201 is off. In other words, the voltage swing on the source of the bias transistor 203 is reduced, and a small size transistor which endures merely 5 volts on the gate source junction can be employed to produce the driving pulse signal.

Figure 2B:
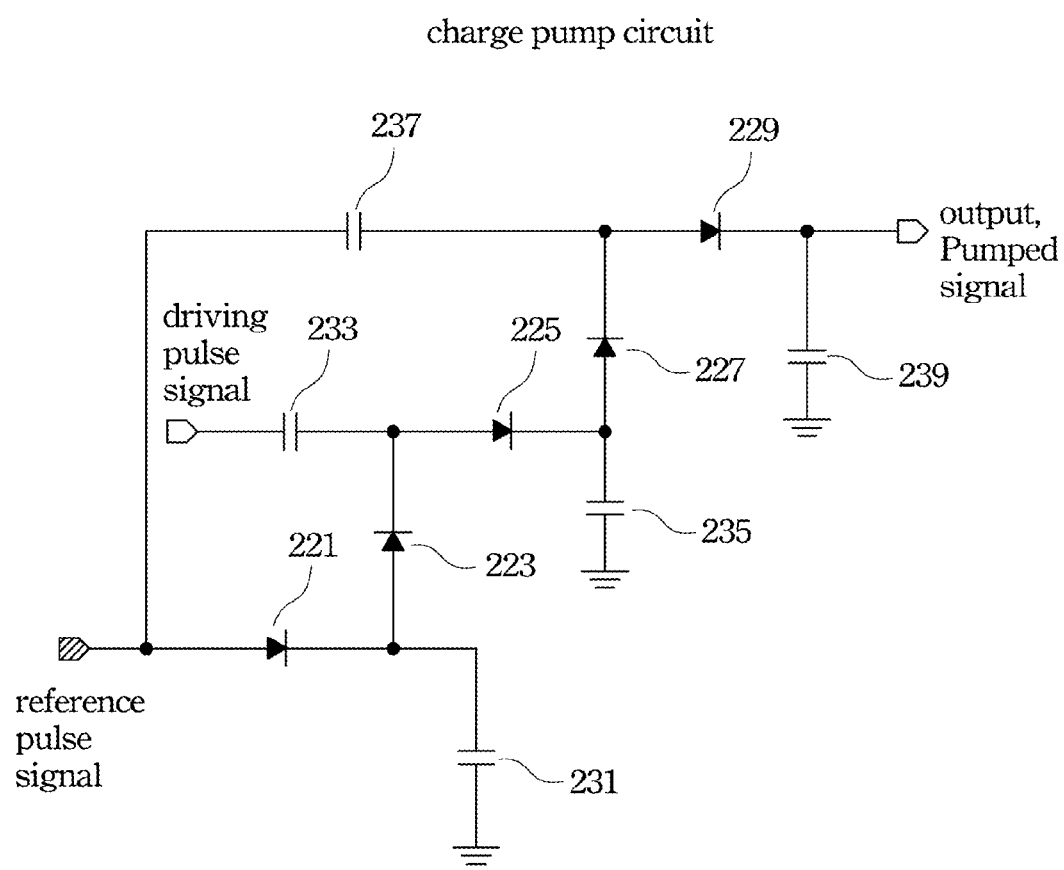
FIG. 2B is a circuit diagram of the charge pump circuit according to one embodiment of the present invention.

FIG. 2B is the circuit diagram of the charge pump circuit according to one embodiment of the present invention. The charge pump circuit includes a first diode 221, a second diode 223, a third diode 225, a fourth diode 227, and a fifth diode 229 connected serially, in which the first diode 221 receives a reference pulse signal and the fifth diode 229 outputs the pumped signal.

The first capacitor 231 is connected to the first diode 221, the second diode 223, and a ground terminal; further, the first capacitor 231 has a first terminal connected to the ground terminal, and has a second terminal connected to an anode of the second diode 223 and a cathode of the first diode 221. The second capacitor 233, connected to the second diode 223 and the third diode 225, receives the driving pulse signal from the charge pump driving circuit; further, the second capacitor 233 has a first terminal receiving the driving pulse signal, and has a second terminal connected to a cathode of the second diode 223.

The third capacitor 235 is connected to the third diode 225, the fourth diode 227, and the ground terminal; further, the third capacitor 235 has a first terminal connected to the ground terminal, and has a second terminal connected to a cathode of the third diode 225 and an anode of the fourth diode 227. The fourth capacitor 237, connected to the fourth diode 27, receives the reference pulse signal; further, the fourth capacitor 237 has a first terminal receiving the reference pulse signal, and has a second terminal connected to a cathode of the fourth diode 227. The fifth capacitor 239, connected to the fifth diode 229, outputs the pumped signal.

In this embodiment, the voltage of the pumped signal is three times of the voltage of the driving pulse signal. In fact, the voltages on the cathodes of the first diode 221, the third diode 225, and the pumped signal voltage are one times, two times, and three times the voltage of the driving pulse signal.

According to the above embodiments, there is rare short circuit current flowing from a supply terminal providing a supply voltage to a ground terminal providing a ground voltage. As a result, power consumption caused by the short circuit current due to the logic state transition can be reduced. In addition, small size transistor can be employed to produce the driving pulse signal, which decreases the circuit area.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A charge pump driving circuit for generating a driving pulse signal to drive a charge pump circuit, comprising:
a control signal generator for generating a first control signal, a second control signal, and a third control signal, wherein the third control signal transits in the first place, the first control signal transits next, and the second control signal transits last; and
a driving signal generator, coupled to the control signal generator, wherein the driving signal generator is controlled by the first control signal, the second control signal and the third control signal, for generating the driving pulse signal, and the driving signal generator has a rare short circuit current flowing from a supply terminal providing a supply voltage to a ground terminal providing a ground voltage, wherein the driving signal generator comprises:
a first transistor having:
a source electrically connected to the supply voltage; and
a gate receiving the first control signal;

a bias transistor having:
   a source electrically connected to the first transistor; and
   a gate receiving a bias voltage;
a second transistor having:
   a drain electrically connected to the bias transistor; and
   a gate receiving the second control signal;
a fourth transistor having:
   a source electrically connected to the supply voltage; and
   a gate electrically connected to the source of the bias transistor; and
a third transistor having:
   a drain, electrically connected to the fourth transistor, for outputting the driving pulse signal; and
   a gate receiving the third control signal,
   wherein the first transistor and the second transistor are conductive at different time interval, and the third transistor and the fourth transistor are conductive at different time interval.

2. The charge pump driving circuit as claimed in claim 1, wherein the voltage at the source of the bias transistor has a maximum value as the supply voltage, and has a minimum value as the supply voltage minus a predetermined value.

3. The charge pump driving circuit as claimed in claim 1, wherein the driving signal generator further comprises a level shift for shifting the voltage of a first reference signal to generate the first control signal.

4. The charge pump driving circuit as claimed in claim 3, wherein the driving signal generator further comprises:
   a current mirror for generating a constant current; and
   a voltage drop circuit, electrically connected to the current mirror, for decreasing the supply voltage to generate the bias voltage.

5. The charge pump driving circuit as claimed in claim 4, wherein the voltage drop circuit comprises three diode connected transistors connected serially for decreasing the supply voltage.

6. The charge pump driving circuit as claimed in claim 1, wherein the first control signal rises after the third control signal falls.

7. The charge pump driving circuit as claimed in claim 6, wherein the first control signal rises before the second control signal rises.

8. The charge pump driving circuit as claimed in claim 7, wherein the third control signal rises after the first control signal falls, while the first control signal falls after the second control signal falls.

9. A charge pump system for increasing voltage of a signal, comprising:
   a charge pump driving circuit for generating a driving pulse signal, wherein the charge pump driving circuit comprises:
     a control signal generator for generating a first control signal, a second control signal, and a third control signal, wherein the third control signal transits in the first place, the first control signal transits next, and the second control signal transits last; and
     a driving signal generator, controlled by the first control signal, the second control signal and the third control signal, for generating the driving pulse signal, wherein the driving signal generator has a rare short circuit current flowing from a supply terminal providing a supply voltage to a ground terminal providing a ground voltage, wherein the driving signal generator comprises:
       a first transistor having:
         a source electrically connected to the supply voltage; and
         a gate receiving the first control signal;
       a bias transistor having:
         a source electrically connected to the first transistor; and
         a gate receiving a bias voltage;
       a second transistor having:
         a drain electrically connected to the bias transistor; and
         a gate receiving the second control signal;
       a fourth transistor having:
         a source electrically connected to the supply voltage; and
         a gate electrically connected to the source of the bias transistor; and
       a third transistor having:
         a drain, electrically connected to the fourth transistor, for outputting the driving pulse signal; and
         a gate receiving the third control signal,
       wherein the first transistor and the second transistor are conductive at different time interval, and the third transistor and the fourth transistor are conductive at different time interval; and
   a charge pump circuit, driven by the driving pulse signal, for generating a pumped signal having voltage being a multiple of the voltage of the driving pulse signal.

10. The charge pump system as claimed in claim 9, wherein the charge pump circuit comprises:
   a first diode, a second diode, a third diode, a fourth diode, and a fifth diode connected serially, wherein the first diode receives a reference pulse signal and the fifth diode outputs the pumped signal;
   a first capacitor connected to the first diode, the second diode, and a ground terminal;
   a second capacitor, connected to the second diode and the third diode, receiving the driving pulse signal from the charge pump driving circuit;
   a third capacitor connected to the third diode, the fourth diode, and the ground terminal;
   a fourth capacitor, connected to the fourth diode, receiving the reference pulse signal; and
   a fifth capacitor, connected to the fifth diode, and outputting the pumped signal.

11. The charge pump system as claimed in claim 10, wherein the first capacitor has a first terminal connected to the ground terminal, and has a second terminal connected to an anode of the second diode and a cathode of the first diode.

12. The charge pump system as claimed in claim 10, wherein the second capacitor having a first terminal receiving the driving pulse signal, and has a second terminal connected to a cathode of the second diode.

13. The charge pump system as claimed in claim 10, wherein the third capacitor having a first terminal connected to the ground terminal, and has a second terminal connected to a cathode of the third diode and an anode of the fourth diode.

14. The charge pump system as claimed in claim 10, wherein the fourth capacitor has a first terminal receiving the reference pulse signal, and has a second terminal connected to a cathode of the fourth diode.

15. The charge pump system as claimed in claim 10, wherein the fifth capacitor has a first terminal connected to a cathode of the fifth diode, and has a second terminal connected to the ground terminal.

16. The charge pump system as claimed in claim 10, wherein the reference pulse signal and the driving pulse signal have the same maximum voltage value.

* * * * *